United States Patent Office 2,769,696
Patented Nov. 6, 1956

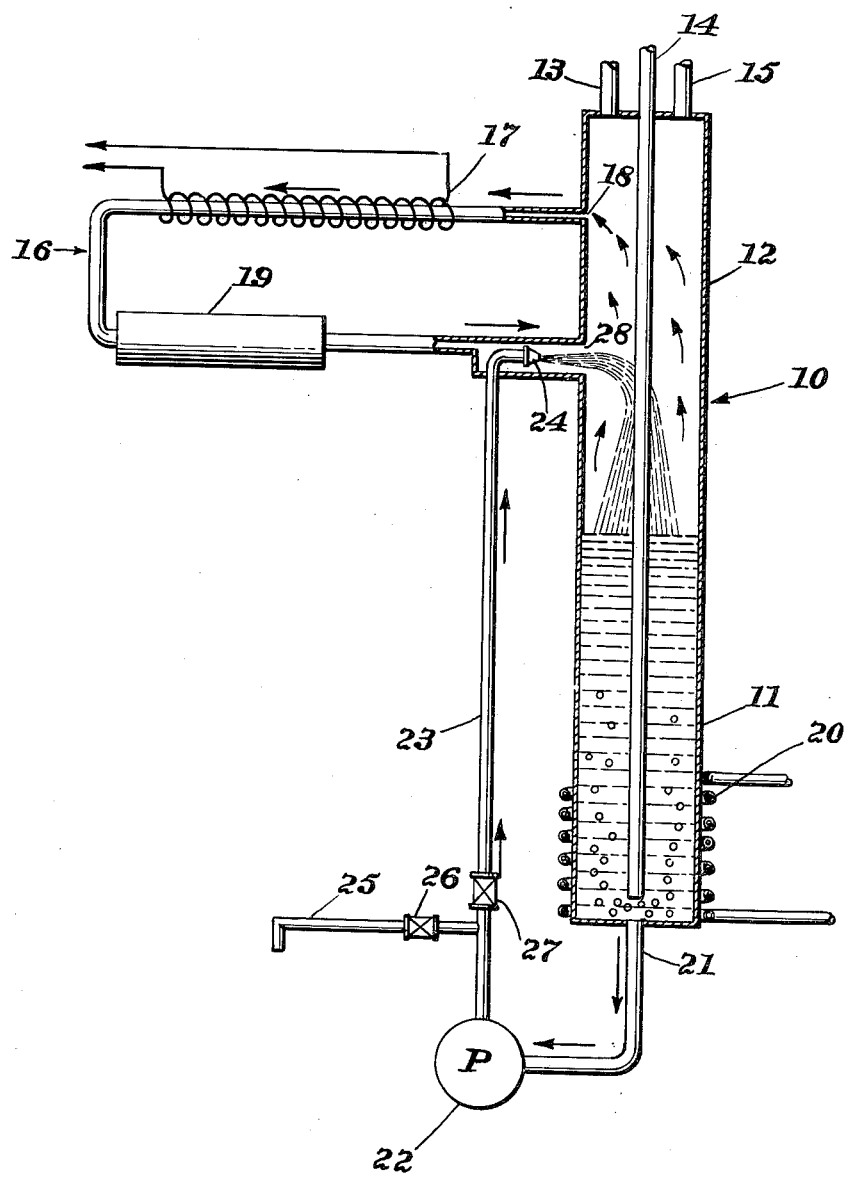

2,769,696

REACTOR

Edward E. Litkenhous, Nashville, Tenn., assignor to Tennessee Products & Chemical Corporation, Nashville, Tenn., a corporation of Tennessee Application October 20, 1952, Serial No. 315,740

11 Claims. (Cl. 23—288)

This invention relates to apparatus for effecting liquid and vapor phase catalyst reactions, and more particularly to apparatus which reacts liquids and gases together.

One object of my invention is to provide apparatus in which any gas may be reacted with any liquid.

Another object of my invention is to provide apparatus in which difficultly oxidizable liquids may be more easily oxidized.

A further object of my invention is to provide an oxidation reactor which will oxidize liquids in less time and much more economically than heretofore possible.

A still further object of my invention is to provide apparatus which affords better control over chemical reactions which by their nature are very critical as to reaction time and temperature.

With these and other objects in view, as will more fully hereinafter appear, my invention consists in certain novel features of construction and arrangement of parts hereinafter fully described, illustrated in the accompanying drawing, and particularly pointed out in the appended claims, it being understood that various changes in form, proportions, size, and minor details of the structure may be made without departing from the spirit or sacrificing any of the advantages of the invention.

The accompanying drawing is an elevation of my reactor, partially sectioned to more clearly illustrate the principal parts thereof.

Numeral 10 indicates generally my reactor which is a closed receptacle in which the lower portion 11 is referred to as the liquid zone and the upper portion 12 is referred to as the vapor zone. The relationship between these two zones will be explained more fully during the progress of this description.

Liquid charging inlet tube 13, gas charging tube 14 and reflux system connection 15 are suitably located in the top of the reactor 10.

Side arm 16, a U-shaped conduit, shown for clarity of illustration in a vertical plane, but which may be attached to the reactor 10 in a horizontally disposed position has a vapor preheater 17, intermediate vapor inlet 18 and vapor catalyst chamber 19.

Any suitable heating means 20, shown here as a heating coil through which steam or other heating fluid may be passed, is adjacent the liquid zone 11. Connected to the bottom of reactor 10 is one end of a liquid recirculatory system comprising outlet line 21, recirculatory pump 22, return line 23, and jet nozzle 24. Discharge line 25, fitted with discharge valve 26, is tapped into return line 23 intermediate pump 22 and control valve 27. It is to be noted that jet nozzle 24 is placed within side arm 16 intermediate vapor catalyst chamber 19 and vapor outlet 28, said jet nozzle being directed away from the vapor catalyst chamber and toward the vapor outlet.

In operation, my reactor is equally adaptable to continuous flow or batch production, wherein a typical reaction, such as the oxidation of benzene to produce phenol and other by-products, such as maleic or phthalic anhydride, would proceed as follows. An initial quantity of benzene and catalyst is charged through liquid charging inlet tube 13 into the liquid zone 11 of reactor 10, where it is heated sufficiently by heating means 20 to at least partially vaporize the benzene which rises and fills the vapor zone 12. While the benzene is being vaporized, oxygen is forced into, and bubbled up through the benzene by means of gas charging tube 14.

Continuous with the bubbling of oxygen and the vaporizing of the benzene, liquid benzene, catalysts, and reaction products are withdrawn from the bottom of reactor 10, and recirculated by means of pump 22 through outlet line 21, return line 23 and jet nozzle 24, where it is discharged through side arm vapor outlet 28, into vapor zone 12 and thence by force of gravity returned to the liquid zone. One accomplishment of this recirculation of liquid benzene is that of keeping the benzene in the liquid zone 11 sufficiently agitated to insure a good mixing with the free oxygen.

The effect of forcing liquid benzene through jet nozzle 24 is to draw benzene vapors through vapor inlet 18 into side arm 16 where they are pre-heated to near reaction temperature by means of vapor pre-heater 17. The vapors are then drawn over a suitable catalyst in chamber 19, such as one with an aluminum oxide base, where they are reacted to produce phenol and other well known by-products.

Generally speaking, time of reaction is critical in the type of oxidation reaction referred to above and my apparatus is ideally suited for carrying out such reactions. For instance, as the vapors are drawn out of the catalyst chamber, they are made to pass by jet nozzle 24 where they are quenched by liquid benzene, thus arresting further reaction. The present apparatus also possesses a number of other important advantages. For example, when used to effect oxidation with a liquid catalyst, the oxidizable liquid and catalyst are intimately admixed by virtue of the agitation made possible by the withdrawal of liquid through 21 and the spraying thereof into the vapor zone through jet 24. Furthermore, in a batch operation, the process is run until all of the benzene has been reacted, then control valve 27 is closed, discharge valve 26 is opened and the reaction products are drawn off through discharge line 25.

In a continuous flow process, once the reaction is sufficiently started, as can be determined by taking of samples periodically from discharge line 25, a steady calibrated flow of benzene is charged into the reactor 10 through charging inlet tube 13 to just replace the quantity of reacted phenol and other by-products continuously drawn off through discharge line 25. In this continuous flow operation, valves 26 and 27 are adjusted to the capacity of the pump 22 so that recirculation will be maintained while valve 26 is open.

Reflux connection 15 leads to any standard and well known type of reflux system. It is not felt necessary to describe the reflux, inasmuch as it may vary to suit the conditions encountered with the particular chemicals being reacted. Nor is it my intention that this invention be limited to any given process or processes, the only limitation on the use of this apparatus being confined to the ingenuity of the user.

It is to be further understood that the form of my invention, herewith shown and described, is to be taken as a preferred example of the same, and that various changes in the shape, size and arrangement of parts may be resorted to without departing from the spirit of my invention or the scope of the subjoined claims.

I claim:

1. An apparatus for reacting liquids with gases comprising: a vertically disposed reactor chamber having means for charging the chamber with liquids and gases to be reacted; liquid heating means adjacent the lower portion of said chamber; a vapor side arm comprising a U-shaped vapor conduit, both ends of which terminate in the upper portion of said chamber, said conduit having a vapor pre-heater adjacent one end, and a heated vapor catalyst chamber intermediate said vapor pre-heater and the other end; a liquid side arm comprising a liquid conduit, one end terminating in the lower portion of said chamber and the opposite end terminating in said vapor side arm intermediate said catalyst chamber and said reactor chamber, said opposite end having a jet nozzle directed toward said reactor chamber; and means for recirculating liquid through said liquid side arm.

2. The apparatus in claim 1 wherein the liquid sprayed through said nozzle causes the vapors to recirculate through said vapor conduit.

3. The apparatus in claim 1 wherein the vapors passing out of said catalyst chamber are quenched by the liquid being sprayed from said nozzle.

4. The apparatus in claim 1 having means for withdrawing the reacted liquids at a rate equal to the rate of charging the unreacted liquids.

5. The apparatus in claim 1, having means for calibrating the rate of liquid recirculation with the rate of reacted liquid withdrawal.

6. An apparatus according to claim 1 wherein the means for recirculating liquid through said liquid side arm is a pump disposed between said reactor chamber and said vapor side arm.

7. An apparatus for reacting liquid with gases comprising a vertically disposed reactor chamber having means for charging the chamber with liquids and gases to be reacted; liquid heating means adjacent the lower portion of said chamber, a vapor side arm comprising a vapor conduit both ends of which terminate in the upper portion of said chamber, said conduit having a vapor pre-heater adjacent one end, and a vapor catalyst chamber intermediate said vapor pre-heater and the other end; a liquid side arm comprising a liquid conduit, one end terminating in the lower portion of said chamber and the opposite end terminating in said vapor side arm intermediate said catalyst chamber and said reactor chamber, and means for recirculating liquid through said liquid side arm.

8. An apparatus for reacting liquids with gases comprising, a generally elongated reactor having a lower liquid containing portion and an upper gas containing portion, a catalyst chamber externally disposed of said reactor, separate intake and outlet means connecting said catalyst chamber only to the gas containing portion of said reactor, said intake means enabling the flow of material from said reactor into said catalyst chamber and said outlet means enabling the flow of material from said catalyst chamber back to reactor whereby material may be withdrawn solely from the gas containing portion, passed through said catalyst chamber and returned to the gas containing portion, heating means associated with said intake means for elevating the temperature of material passing through said intake means from said reactor to said catalyst chamber and external circulating means connecting the lower portion of said reactor to the upper portion thereof for recirculating material contained in said reactor.

9. The structure defined in claim 8 wherein said external circulating means has its upper end connected to said outlet means intermediate said catalyst chamber and said reactor.

10. The apparatus in claim 8 having means for quenching the materials which have passed through said catalyst chamber.

11. The apparatus in claim 8, having means for charging reactant materials into said reactor chamber.

References Cited in the file of this patent

UNITED STATES PATENTS

| | | |
|---|---|---|
| 1,079,278 | Wilbuschewitsch | Nov. 18, 1913 |
| 1,398,587 | Dean | Nov. 29, 1921 |
| 2,020,850 | Myhren et al. | Nov. 12, 1935 |
| 2,057,100 | Jespersen | Oct. 13, 1936 |
| 2,301,044 | Heard et al. | Nov. 3, 1942 |
| 2,332,527 | Pyzel | Oct. 26, 1943 |
| 2,433,255 | Atwell | Dec. 23, 1947 |